United States Patent
Wada et al.

(10) Patent No.: US 9,505,074 B2
(45) Date of Patent: Nov. 29, 2016

(54) WEAVING CONTROL DEVICE FOR ARTICULATED ROBOT

(71) Applicant: Kobe Steel, Ltd., Hyogo (JP)

(72) Inventors: Takashi Wada, Kobe (JP); Yoshiharu Nishida, Kobe (JP); Yoshihide Inoue, Fujisawa (JP); Shuichi Inada, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 71 days.

(21) Appl. No.: 14/434,083

(22) PCT Filed: Oct. 15, 2013

(86) PCT No.: PCT/JP2013/078016
§ 371 (c)(1),
(2) Date: Apr. 7, 2015

(87) PCT Pub. No.: WO2014/061681
PCT Pub. Date: Apr. 24, 2014

(65) Prior Publication Data
US 2015/0290804 A1  Oct. 15, 2015

(30) Foreign Application Priority Data

Oct. 19, 2012 (JP) .................. 2012-231871

(51) Int. Cl.
*B23K 9/02* (2006.01)
*B23K 9/095* (2006.01)
(Continued)

(52) U.S. Cl.
CPC .......... *B23K 9/0216* (2013.01); *B23K 9/0953* (2013.01); *B23K 9/173* (2013.01); *B25J 9/10* (2013.01); *B25J 9/1641* (2013.01); *Y10S 901/42* (2013.01)

(58) Field of Classification Search
CPC .. B23K 9/0216; B23K 9/0953; B25J 9/1641; G05B 2219/49384; Y01S 901/02; Y01S 901/08; Y01S 901/42
See application file for complete search history.

(56) References Cited

U.S. PATENT DOCUMENTS

2012/0000891 A1   1/2012 Nakanishi et al.
2012/0239198 A1   9/2012 Orita et al.
(Continued)

FOREIGN PATENT DOCUMENTS

JP    H06-222817 A    8/1994
JP    H07-32147 A     2/1995
(Continued)

OTHER PUBLICATIONS

The extended European search report issued by the European Patent Office on Jun. 29, 2016, which corresponds to European Patent Application No. 13847073.7-1870 and is related to U.S. Appl. No. 14/434,083.
(Continued)

*Primary Examiner* — Dale Moyer
(74) *Attorney, Agent, or Firm* — Studebaker & Brackett PC

(57) ABSTRACT

A weaving control device of a multi-joint robot, which achieves high-precision weaving, and suppresses occurrence of weaving movement error stemming from the movement of another joint axis and the dynamic characteristics of the motor driving the joint axis. The weaving control device contains: a signal computation unit that computes the target position signal for each axis; a filter computation unit that computes a target command signal resulting from low-pass filter processing of the target position signal; and a motor control unit that drives each axis with the target command signal as an input. The frequency characteristics of the gain of the motor control unit are configured in an approximately flat manner, and the dynamic characteristics from the target position to the motor output angle are similar to the filter. A weaving signal correction unit computes a target position signal having a corrected gain on the basis of filter characteristics.

6 Claims, 15 Drawing Sheets

(51) Int. Cl.
  *B23K 9/173* (2006.01)
  *B25J 9/10* (2006.01)
  *B25J 9/16* (2006.01)

(56) References Cited

U.S. PATENT DOCUMENTS

| | | | |
|---|---|---|---|
| 2013/0234642 A1* | 9/2013 | Igarashi | H02P 29/0038 318/611 |
| 2015/0105905 A1* | 4/2015 | Nishida | B25J 9/1641 700/254 |
| 2015/0112484 A1* | 4/2015 | Nishida | G05B 19/4093 700/254 |
| 2015/0367511 A1* | 12/2015 | Nishida | B25J 9/1641 700/254 |

FOREIGN PATENT DOCUMENTS

| | | |
|---|---|---|
| JP | H07-60667 A | 3/1995 |
| JP | H10-235582 A | 9/1998 |
| JP | 2003-280703 A | 10/2003 |
| JP | 2006-059037 A | 3/2006 |
| JP | 2007-216232 A | 8/2007 |
| JP | 2010-123018 A | 6/2010 |
| JP | 2010-186461 A | 8/2010 |
| JP | 2013-248681 A | 12/2013 |

OTHER PUBLICATIONS

International Search Report; PCT/JP2013/078016; Jan. 21, 2014.
Written Opinion of the International Searching Authority; PCT/JP2013/078016; Jan. 21, 2014.

* cited by examiner $\theta_1$: ROTATIONAL ANGLE OF JOINT 1
$m_1$: MASS OF LINK 1
$I_1$: INERTIA MOMENT OF LINK 1 AROUND CENTER-OF-GRAVITY POSITION
$l_1$: LENGTH OF LINK 1
$l_{g1}$: LENGTH FROM JOINT 1 TO CENTER OF GRAVITY OF LINK 1
$g$: GRAVITATIONAL ACCELERATION

WEAVING CONTROL DEVICE FOR ARTICULATED ROBOT

TECHNICAL FIELD

The present invention relates control of an articulated robot used in arc welding, for example, and more particularly relates to control of an articulated robot capable of weaving movement with high trajectory precision.

BACKGROUND ART

When welding multiple base materials by arc welding, welding with weaving is employed in which a welding electrode is advanced in the welding direction while performing a sine wave weaving movement to the left and right directions of the weld line. This welding with weaving conventionally has been performed by either oscillating the welding torch itself to the left and right, or tilting to the left and right with the welding torch itself as the center. High trajectory precision is required in a case of an articulated robot performing such welding with weaving.

The following is known art relating to weaving movement.

Japanese Unexamined Patent Application Publication No. 2006-59037 (PTL 1) discloses a welding robot control device which effects sure and precise weaving movement at an amplitude instructed beforehand.

When causing a welding robot to perform weaving movement, angular instruction values are generated for each joint motor based on the instructed weaving frequency and amplitude, and the weaving movement is controlled based on those instruction values. However, the motor is dependent on motor dynamic characteristics (control time constants of feedback system) and cannot move exactly according to the angular instruction values, and consequently cannot weave at the instructed amplitude. The art disclosed in PTL 1 solves this problem as follows. First, the difference in angle instruction values between not performing weaving movement and performing weaving movement is calculated for each joint, as a weaving signal. The gain of the motor feedback system (output amplitude/instructed amplitude) is calculated based on the control time constants of the feedback system of the motor and the weaving frequency, and a value obtained by multiplying the weaving signal by the inverse of the gain is added to the angular instruction value of each joint for when not performing weaving movement, thereby calculating final angular instruction values for each joint.

Also, Japanese Unexamined Patent Application Publication No. 6-222817 (PTL 2) discloses a technology which is applied to a robot that performs welding with weaving, so that a weaving waveform can be traced with precision.

In order to solve the problem of the weaving amplitude changing in a manner dependent on the motor dynamic characteristics, the technology disclosed in PTL 2 obtains a motor drive system model (transfer function G(s)) determined based on the attitude of the robot, and inputs an angular instruction value, obtained by multiplying the angular instruction value for each axis during weaving movement by 1/G(s), to the motor.

CITATION LIST

Patent Literature

PTL 1: Japanese Unexamined Patent Application Publication No. 2006-59037

PTL 2: Japanese Unexamined Patent Application Publication No. 6-222817

SUMMARY OF INVENTION

Technical Problem

In a case where a cyclic signal such as for a weaving movement is input as an instruction value to motors for moving the axes of an articulated robot, amplitude and phase of the output angle characteristically changes as to the instruction value. Accordingly, this change characteristic needs to be predicted and the angular instruction values corrected in order to accurately move the tip position of the robot. Factors contributing to this change in amplitude and phase are dynamic characteristics of the motor itself (control time constant of the feedback system), and external force (in a case of a robot, influence from movement of other axes). The problems can be summarized as follows.

(1) The amplitude of the motor angle changes as to the instruction value, due to the control time constant of the feedback system of the motor.

(2) The phase of each motor as to the instruction value differs since the control time constant of the feedback system of each motor is different.

(3) The amplitude of the motor angle changes as to the instruction value, due to the influence of movement of other axes.

(4) The phase of each motor angle changes as to the instruction value, due to the influence of movement of other axes.

However, the aforementioned PTL 1 has only solved (1) of these problems, and no consideration whatsoever has been given to (2) through (4).

Further, correcting angular instruction values (PTL 1 also employs this technique) can be given as a method to solve the above-described problems. However, output angle change characteristics as to the angular instruction values needs to be modeled and the degree of change precisely predicted in order to perform correction. If the amount of correction is great, or the model is complex, the amount of error also increases, as a matter of course. To begin with, control needs to be perform to minimize the amount of change in amplitude and phase due to the above-described change characteristics, in order to reduce this error.

Also, PTL 2 is a technology solving (1) and (2) of the above-described four problems, and no consideration whatsoever has been given to (3) and (4).

Further, in the same way as the technology disclosed in PTL 1, the technology disclosed in PTL 2 also solves the problem by modeling motor characteristics, predicting the amount of change of amplitude and phase, and correcting angular instruction values. Accordingly, the amount of correction is not fundamentally reduced, and the amount of error increases if the amount to correct is large or the model is complex.

That is to say, the technologies disclosed in PTLs 1 and 2 do not necessarily solve all of the above-described four problems, and weaving motion with a high trajectory precision has not been realized.

The present invention has been made in light of the above-described problems, and accordingly it is an object thereof to provide a weaving control device for an articulated robot having multiple axes, which can suppress occurrence of error in weaving movement due to dynamic characteristics of the motor itself which moves the axes of the articulated robot (the above-described problems (1) and (2)), and occurrence of error in weaving movement due to influence of other axes moving (the above-described problems (3) and (4)), to enable weaving movement with a high trajectory precision.

Solution to Problem

The weaving control device for an articulated robot according to the present invention has implemented the following technological means in order to solve the above-described problems.

A weaving control device for an articulated robot according to the present invention drives a plurality of joint axes so that a tool attached to the articulated robot traces a desired weaving trajectory. The control device includes: a signal computation unit that computes a target position signal for each axis of the articulated robot based on the weaving trajectory; a filter computation unit that performs low-pass filter processing on the computed target position signal to remove a natural frequency component of the articulated robot, and computers a filter-processed target instruction signal for each axis of the articulated robot; and a motor control unit that drives each axis of the articulated robot with the filter-processed target instruction signal as input. The frequency characteristics of gain at the motor control unit are configured approximately flat. The signal computation unit computes a gain-corrected target position signal.

Preferably, the motor control unit may be configured including a position feedback unit and a speed feedback unit and a speed feed-forward unit; the signal computation unit computing a gain-corrected target position signal based on filter characteristics at the filter computation unit and the weaving trajectory.

More preferably, the filter used for the low-pass filter processing may be configured to be the same for all axes; and wherein the signal computation unit may be configured to compute a gain-corrected target position signal by multiplying the target position signal by an inverse of a filter gain in a weaving frequency obtained from filter characteristics of the filter computation unit.

Even more preferably, the signal computation unit may be configured to compute a target signal subjected to phase compensation, in addition to gain correction, based on filter characteristics of the filter computation unit and weaving frequency obtained from filter characteristics of the filter computation unit.

Even more preferably, the motor control unit may be configured further including a feed-forward control unit which predicts inertia force, gravity, and friction force acting on an own axis by the own axis accelerating/decelerating, and adds these to a torque instruction value output from the speed feedback.

Even more preferably, the motor control unit may be configured further including a feed-forward control unit which predicts interference inertia force and centrifugal/Coriolis force acting on the own axis by another axis accelerating/decelerating, and adds these to a torque instruction value output from the speed feedback.

Advantageous Effects of Invention

Using the weaving control device according to the present invention in an articulated robot having multiple axes suppresses occurrence of error in weaving movement occurring to dynamic characteristics of a motor itself which moves the axes of the articulated robot, and error in weaving movement due the influence of other axes moving. Accordingly, weaving movement can be performed with high trajectory precision.

DESCRIPTION OF EMBODIMENTS

Figure 1:
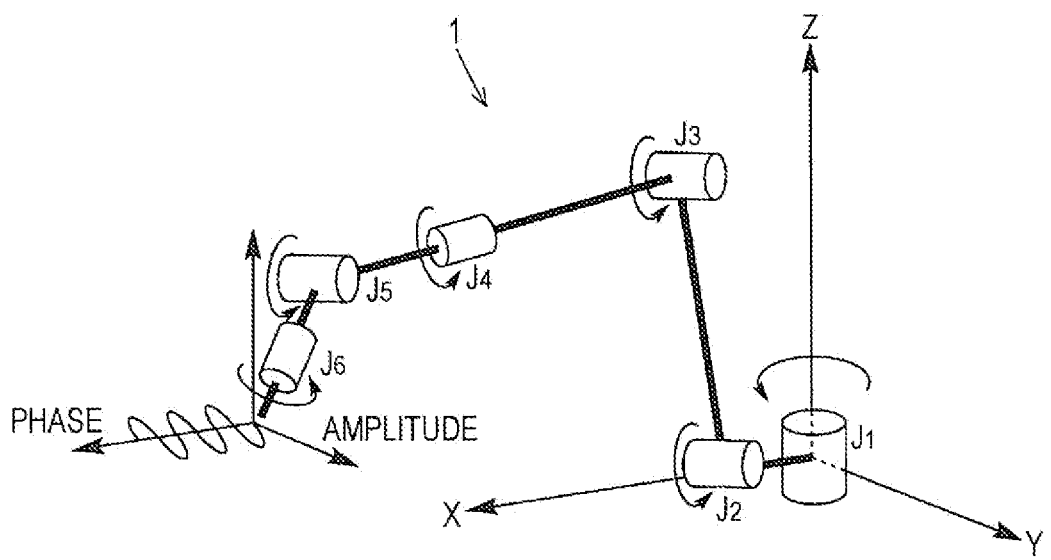
FIG. 1 is a schematic diagram illustrating the overall configuration of an articulated robot to which a weaving control device according to an embodiment of the present invention is applied.

A weaving control device for an articulated robot according to embodiments of the present invention will be described with reference to the drawings. Note that in the following description, the same parts are denoted by the same reference numerals. The names and functions are also the same. Accordingly, detailed description thereof will not be repeated.

First Embodiment

Overall Configuration

First, the overview of a vertical articulated robot (hereinafter also may be referred to simply as "articulated robot") to which a weaving control device according to a first embodiment is applied will be described.

FIG. 1 is a diagram illustrating an overview of an articulated robot 1 to which the weaving control device according to the present embodiment has been applied, as an example of a robot which performs tilting movement (weaving movement) of a welding torch. This articulated robot 1 is a vertical articulated robot having six joints, J1 through J6. The welding torch is provided at the tip of the J6 axis, and arc welding is performed by a welding wire fed out from the welding torch. The articulated robot 1 is set so as to perform movement where the welding wire is tilted at a preset amplitude and frequency (weaving movement) while moving in a weld line direction connecting a preset weld start point and weld end point, with between the weld start point and weld end point being a weld work section.

Such an articulated robot 1 includes, in addition to the main unit of the articulated robot 1 illustrated in the drawing, a control device (servo control unit) which has a teach pendant and which also performs servo control of the axes, and a host computer (host CPU). The control device and host computer realize a weaving control device 10 according to the first embodiment.

The control device (servo control unit) controls the welding torch provided to the articulated robot 1 so as to perform weaving movement moving along the aforementioned weld line, following a program taught beforehand. There are cases where this teaching program is created using a teach pendant connected to the control device, and cases where the teaching program is created using an offline teaching system using the host computer. In either case, the teaching program is created before the actual operation.

[Control Block]

Figure 2:
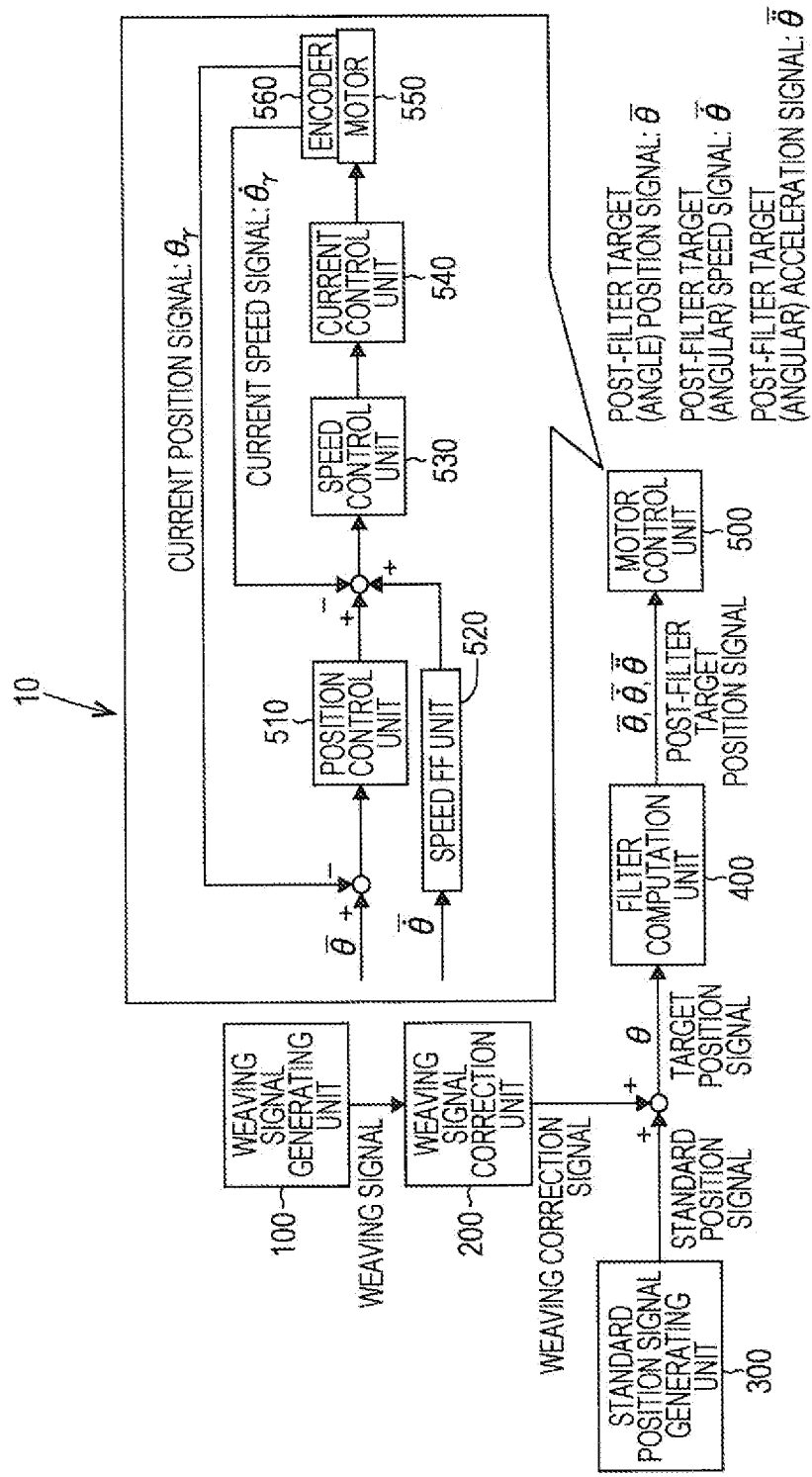
FIG. 2 is a control block diagram of a weaving control device according to a first embodiment of the present invention.

FIG. 2 is a control block diagram of the weaving control device 10 which controls the articulated robot 1 in FIG. 1. This weaving control device 10 moves multiple joint axes so as to cause a tool (the welding torch in this case) attached to the articulated robot 1 so as to perform a predetermined action (the weaving movement in this case). FIG. 2 corresponds to one joint axis out of the multiple joint axes (six axes exemplified in FIG. 1).

The weaving control device 10 includes a signal computation unit (weaving signal generating unit 100, weaving signal correction unit 200, standard signal position generating unit 300) to compute target position signals for each axis of the articulated robot 1, based on a weaving trajectory. The weaving control device 10 also includes a filter computation unit 400 which performs low-pass filter processing to remove natural frequency component of the articulated robot 1 from the computed target position signals, and computes filtered target instruction signals for each axis of the articulated robot 1. The weaving control device 10 also includes a motor control unit 500 which takes the filtered target instruction signals as input and drives each axis of the articulated robot 1. The motor control unit 500 includes a position feedback unit 510, a speed feedback unit, and a speed feed-forward unit 520. The gain frequency characteristics of the motor control unit 500 are configured approximately flat, and a feature of the weaving signal correction unit 200 of the signal computation unit is that it computes gain-corrected target position signals. The term "approximately flat" means that the gain frequency characteristics in the motor control unit 500 are approximately flat enough so as to not effect good weaving movement. In other words, if the characteristics of the motor control unit 500 are plotted on a Bode diagram, the characteristics of the grain curve are either flat, or flat enough so as to not effect good weaving movement.

Note that in the following, the characteristics of the components in the control block are all dynamic characteristics (even if not described as being dynamic characteristics). The notation FB means feedback, and the notation FF means feed-forward. The blocks will be described in further detail below.

The standard position signal generating unit 300 generates a standard position signal as angular position for each axis of the articulated robot 1, so as to trace a tip trajectory of the articulated robot 1 in a case with no weaving movement.

The weaving signal generating unit 100 generates a weaving signal as an angular position obtained by subtracting an angular position generated by the standard position signal generating unit 300 from the angular position of each axis of the articulated robot 1, so as to trace a tip trajectory of the articulated robot 1 in a case with weaving movement. This angular position basically is a cyclic signal for a specified weaving frequency.

The weaving signal correction unit 200 corrects the weaving signal generated at the weaving signal generating unit 100 to generate a weaving correction signal. A feature of the first embodiment is that the correction at the weaving signal correction unit 200 is performed based on the filter used at the filter computation unit 400. Details of this correction method will be described later.

The filter computation unit 400 performs low-pass filter processing on the target position signal obtained by adding the standard position signal and weaving correction signal, to remove the natural frequency component of the articulated robot 1, and thus generates a post-filter target position signal. The post-filter target position signal generated here includes, in addition to angular position, angular speed and angular acceleration, depending on the control method at the motor control unit 500. Details of the filter processing method will be described later.

Figure 3:
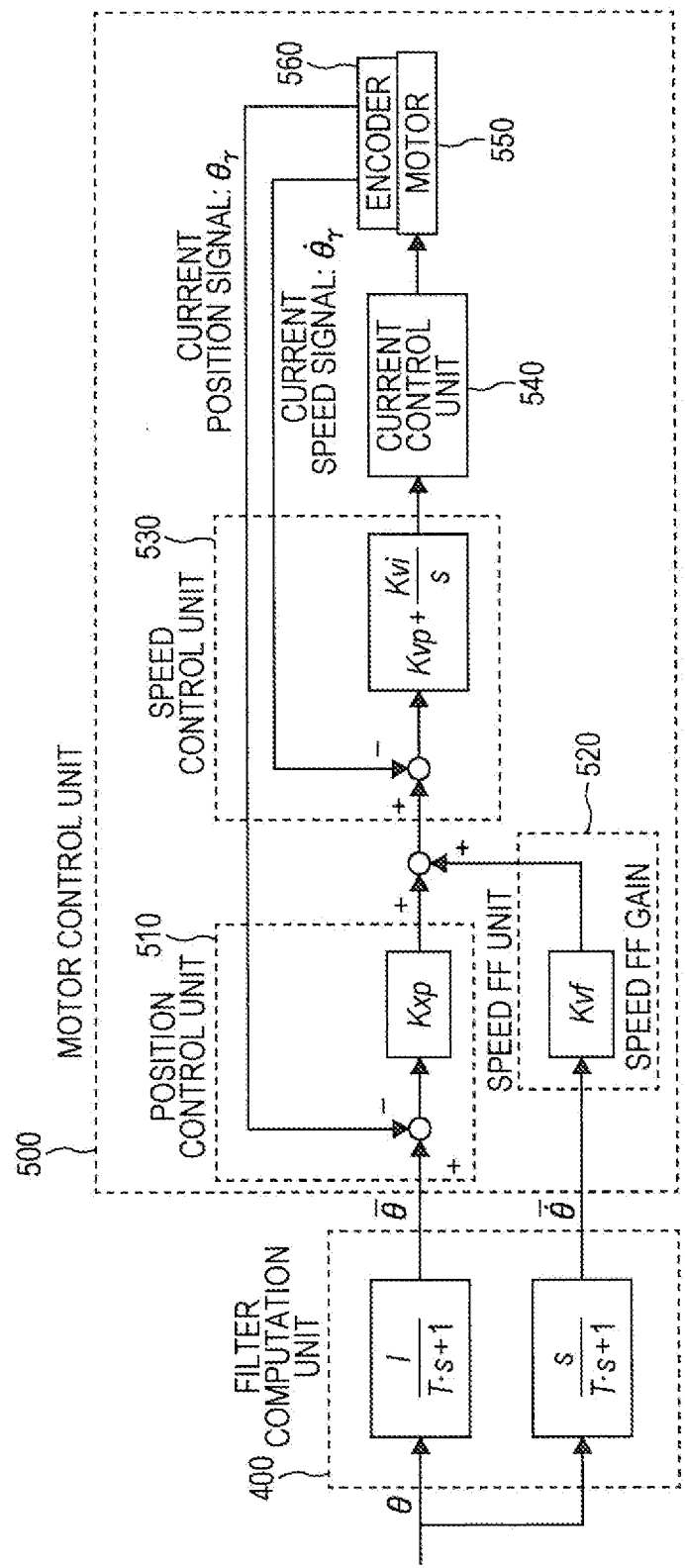
FIG. 3 is a detailed control block diagram of a filter computation unit and motor control unit in FIG. 2.

The motor control unit 500 controls a motor 550 based on the post-filter target position signal. As a most common motor control method, control is performed by the position (feedback) control unit 510 based on a detection angle from an encoder 560, a speed (feedback) control unit 530, and a current control unit 540, as illustrated in FIG. 3 which is a detailed diagram of FIG. 2. A feature of the first embodiment is that, in addition to these, there also is added the speed feed-forward unit 520 which performs speed feed-forward control by multiplying the post-filter target position signal by the speed feed-forward gain. Details of the motor control method will be described later.

The weaving control device 10 according to the first embodiment adds speed feed-forward control to the control method at the motor control unit 500, thereby reducing delay due to dynamic characteristics of the motor 550. Another feature of the weaving control device 10 according to the first embodiment is that the dynamic characteristics from the target position signal to the current position signal detected by an encoder can be similar to the filter used at the filter computation unit 400.

Another feature is that the weaving signal is corrected, taking advantage of the fact that the dynamic characteristics from the target position signal to the current position signal can be similar to an optionally-designed filter, taking into consideration these filter characteristics to generate the weaving correction signal.

Accordingly, a good weaving waveform can be obtained simply by correcting a weaving waveform disturbed by delay due to dynamic characteristics of the motor 550 at each axis of the articulated robot 1, based on a set filter.

[Filter Processing Method and Motor Control Method]

The filter computation unit 400 and motor control unit 500 of the weaving control device 10 according to the first embodiment, illustrated in FIG. 3 and FIG. 4, will be described here.

Here, T represents a filter time constant, Kxp represents proportional gain of the position feedback unit 510, Kvp and Kvi represent proportional gain and integration gain of the speed control unit 530, Kvf represents feed-forward gain of the speed feed-forward unit 520, and s represents a Laplace operator.

Note that T, Kxp, Kvp, and Kvi are set according to the dynamic characteristics of the articulated robot 1, and Kvf is set to a value between 0 and 1. Also, the filter computation unit 400 calculates angular position and angular speed as a post-filter target position signal here, using a first-order low-pass filter. The motor control illustrated in FIG. 3 is performed based on the angular position and angular speed. Note that a second-order or third-order filter may be used for the low-pass filter of the filter computation unit 400 as necessary.

Figure 4:
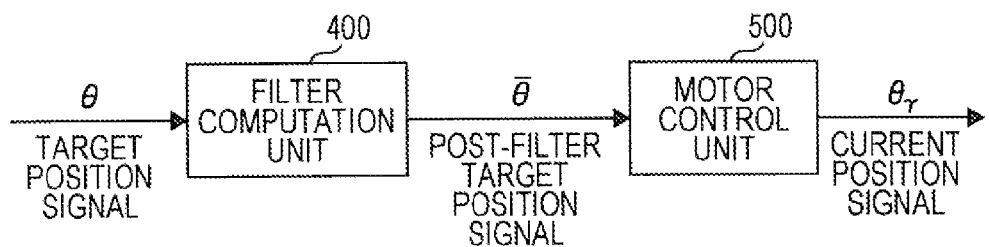
FIG. 4 is a simplified version of the control block diagram illustrated in FIG. 3.

Delay due to dynamic characteristics of the motor 550 is reduced by the control method illustrated in FIG. 2, and characteristics from a target position signal θ to a current position signal θr can be similar to a first-order low-pass filter (F(s)=1/(T·s+1)) used by the filter computing unit 400, as illustrated in FIGS. 3 and 4. This will be described with reference to FIG. 4.

Figure 5:
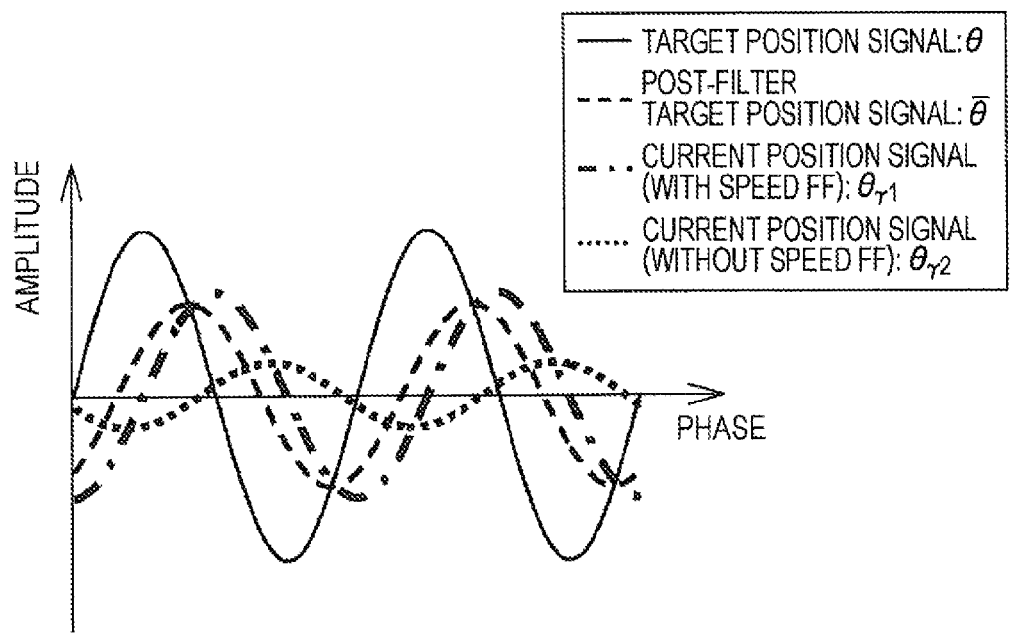
FIG. 5 is a diagram illustrating output waveforms of an articulated robot controlled by the control block diagram illustrated in FIG. 4.

FIG. 5 illustrates each output waveform in a case the target position signal θ is a sine wave signal. In FIG. 5, the solid line represents the target position signal, and the broken line represents the post-filter target position signal. The dot-dash line represents the current position signal of the motor 550 when speed feed-forward control is used, and the dotted line represents the current position signal of the motor 550 when speed feed-forward control is not used. As can be seen here, the current position signal when speed feed-forward control is used is close to the post-filter target position signal, meaning that characteristics from the target position signal θ to the current position signal θr have been able to be similar to the filter characteristics. On the other hand, it can be seen that the amplitude of the current position signal when speed feed-forward control is not used markedly decreases, so a large correction is necessary when performing correction.

[Weaving Signal Correction Method]

Using the above-described filter processing method and motor control method enables the dynamic characteristics from the target position signal θ to the current position signal θr can be made to be similar by a transfer function of an optionally-designed filter. The weaving signal correction unit 200 uses this to correct the weaving signals. Two correction methods (gain correction method and gain phase correction method) will be described below.

Gain Correction Method

In this gain correction method, the weaving signal generated at the weaving signal generating unit 100 (weaving frequency of ω[Hz]) is multiplied by the inverse of the gain at filter F(s) frequency ω (filter gain) used by the filter computing unit 400, thereby generating a weaving correction signal. The calculation expression of this weaving correction signal is as shown in the following Expression (1)

[Math 1]

$$\bar{\theta}_\omega = |1/F(j\omega)| \cdot \theta_\omega \qquad (1)$$

(where j is an imaginary unit)

Accordingly, the change in amplitude at the time of inputting cyclic signals to the motor 550 can be corrected. Note that the correction here is not dependent on the dynamic characteristics of the motor 550, and based only to the optionally designed filter.

However, no correction is performed here as to phase change, so the amount of phase change differs for each axis if a different filter is set to each axis by the filter computation unit 400, and a good weaving waveform is not obtained. Accordingly, when using this gain correction method, the filter used at the filter computation unit 400 is preferably the same for all axes of the articulated robot 1, and the amount of phase change is also preferably equal for all axes.

Figure 6:
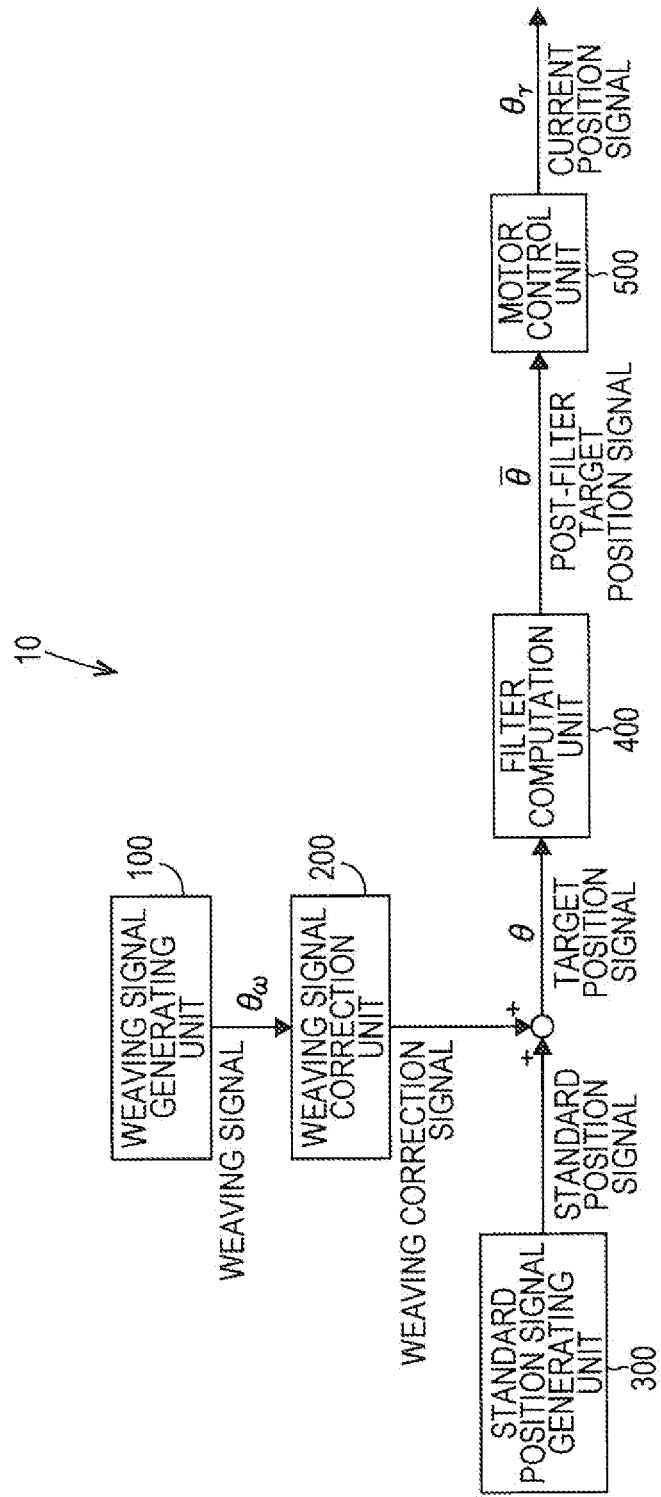
FIG. 6 is a simplified version of the control block diagram illustrated in FIG. 2.
Figure 7:
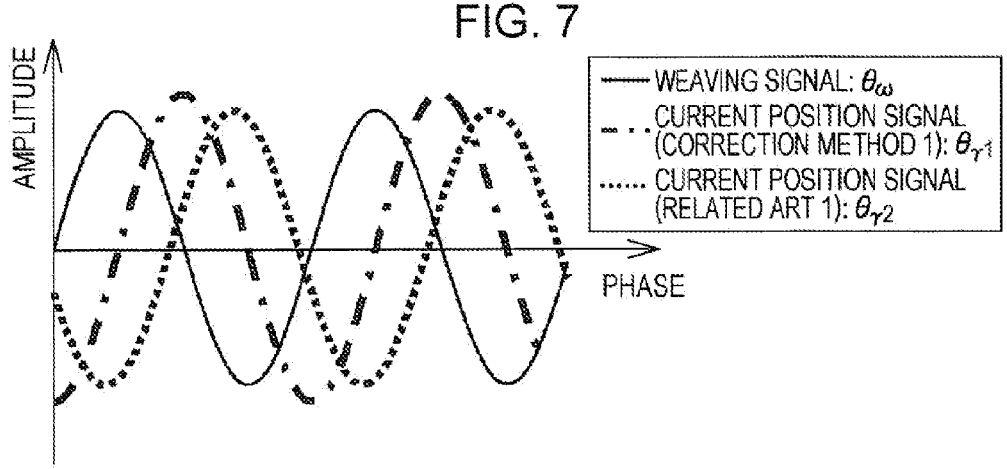
FIG. 7 is a diagram (part 1) illustrating output waveforms of an articulated robot controlled by the control block diagram illustrated in FIG. 6.

FIG. 7 illustrates output waveforms in a case of using the control block (FIG. 6), using such a gain correction method (correction method 1).

FIG. 7 shows an output waveform according to the correction method 1, and an output waveform in a case of having performed correction by a related art 1 (technology according to PTL 1, hereinafter described as "related art 1"), for comparison. The solid line represents weaving signals, the dot-dash line represents the current position signal of the motor 550 according to the correction method 1, and the dotted line represents the current position signal of the motor 550 according to the related art 1. Note that only a single axis is being driven here, so the influences of other axes operating are not included.

It can be seen from here that the amplitude of the current position signal of motor 550 is close to the amplitude of the weaving signal, and that correction is being performed suitably in either case. However, correction according to the related art 1 is being performed assuming that the motor model is completely known.

Figure 8:
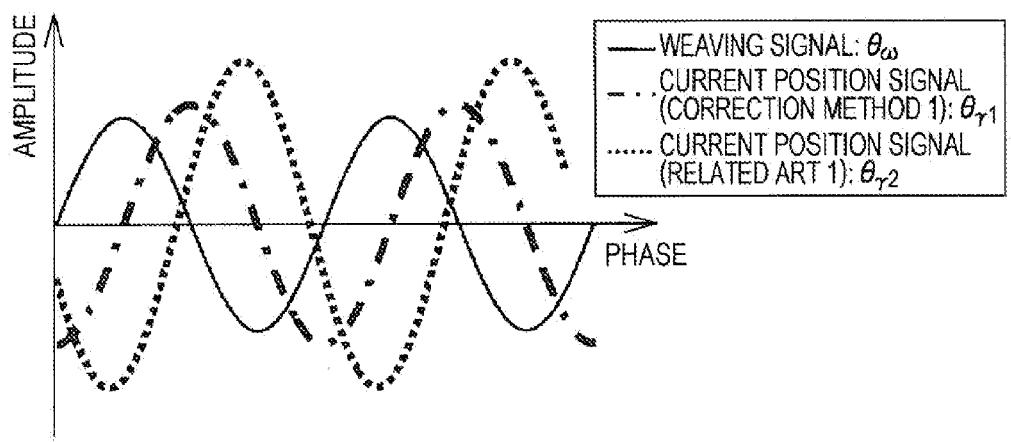
FIG. 8 is a diagram (part 2) illustrating output waveforms of the articulated robot controlled by the control block diagram illustrated in FIG. 6.

FIG. 8 illustrates the results of a case where the motor model is deviated in such a related art 1. It can be seen from here that the amplitude of the current position signal of motor 550 in the related art 1 is markedly deviated. That is to say, it can be seen that deviation of the motor model in correction by the related art 1 results in desirable control not being able to be realized.

Gain Phase Correction Method

In the gain phase correction method, the weaving signal (weaving frequency is ω[Hz]) generated by the weaving signal generating unit 100 is subjected to compensation in which the change in amplitude and phase delay of the weaving signal is estimated based on the filter F(s) used by the filter computation unit 400 and weaving frequency. For example, the phase delay φ is estimated from the following Expression (2), and the amplitude change A is estimated from the following Expression (3). The phase advance compensation and gain correction are performed based on these values.

[Math 2]

$$\phi = \angle F(j\omega) \qquad (2)$$

[Math 3]

$$A = |F(j\omega)| \quad (3)$$

Accordingly, the change of amplitude and change of phase at the time of inputting cyclic signals to the motor 550 can be corrected.

Figure 9:
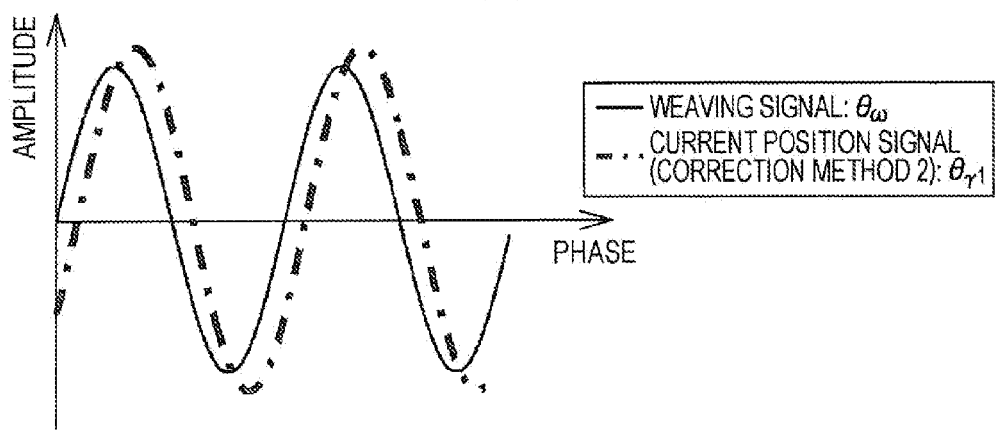
FIG. 9 is a diagram (part 3) illustrating output waveforms of the articulated robot controlled by the control block diagram illustrated in FIG. 6.

FIG. 9 shows weaving signals (solid line), and an output waveform (dot-dash line) in a case of using the control block (FIG. 6) using such a gain phase correction method (correction method 2). Unlike the correction method 1, the correction method 2 also compensates for phase delay. Accordingly, it can be seen from FIG. 9 that there is less offset in phase between the weaving signal and the current position signal of the motor 550 according to the correction method 2, as compared with the correction method 1.

As described above, according to the weaving control device according to the first embodiment, the characteristics from a target position to motor output angle can be made to be similar to a filter used in low-pass filter processing, by performing speed feed-forward control at the motor control unit. Correction of amplitude of the target position is performed based on this filter, so in the articulated robot, occurrence of error in weaving movement due to dynamic characteristics of the motor itself that moves the axes of the articulated robot can be suppressed. Accordingly, movement such as weaving and the like can be performed with high trajectory precision. Note that deviation in phase shift of each axis is solved by using the same filter for all axes. As a result the related art has had a problem that the amount of calculation that is necessary for correction was great, since the motor including the control device was modeled and the target position was corrected based on the model, and that correction does not work well in a case where the error of the model is large. The weaving control device according to the first embodiment has enabled these problems to be solved.

Second Embodiment

A weaving control device 20 according to a second embodiment of the present invention will be described below. The weaving control device according to the present embodiment differs from the weaving control device 10 according to the first embodiment described above with regard to the way of the motor control unit giving control characteristics. Other configurations are the same as in the first embodiment, so description will not be repeated here regarding portions which overlap those described above.

The speed feed-forward unit 520 was provided to the motor control unit 500 in the above-described first embodiment, so that the dynamic characteristics from the target position signal to the current position signal are similar to the optionally designed filter. However there are cases where this approximation precision is not sufficient.

This is conceivably due to the following reason. That is to say, each joint of the articulated robot 1 is affected by inertia and/or gravity, which changes according to the attitude of the articulated robot 1, and by friction dependent on speed and so forth. Accordingly, speed feed-forward control alone cannot sufficiently enable the dynamic characteristics from the target position signal to the current position signal to be similar to the optionally designed filter.

The weaving control device 20 according to the second embodiment effects control to strictly cause the dynamic characteristics from the target position signal to the current position signal to be similar to the optionally designed filter. Thus, weaving precision can be further improved just by performing correction of weaving signals based on the optionally designed filter.

Figure 10:
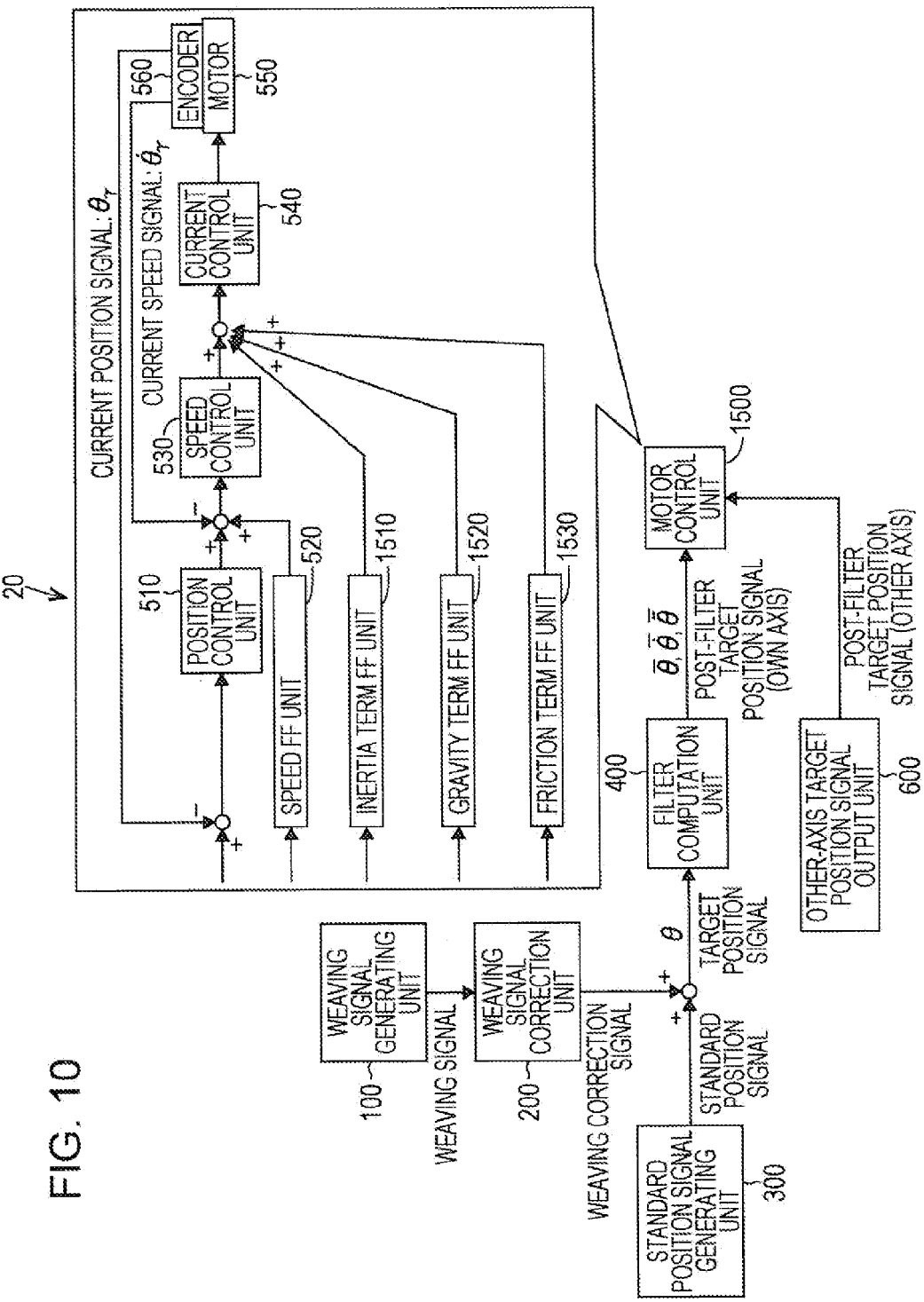
FIG. 10 is a control block diagram of a weaving control device according to a second embodiment of the present invention.

FIG. 10 is a control block diagram of the weaving control device 20 according to the second embodiment. The control block diagram of FIG. 10 also corresponds to one joist axis of the multiple joint axes of the articulated robot 1, in the same way as with FIG. 2.

The weaving control device 20 differs from the weaving control device 10 illustrated in FIG. 2 with regard to the point that a motor control unit 1500 has been provided instead of the motor control unit 500, and the point that an other-axis target position signal output unit 600 has further been provided which gives information of other axes to the motor control unit 1500.

The motor control unit 1500 includes, in addition to the configuration of the motor control unit 500 of the weaving control device 10, an inertia term feed-forward unit 1510, a gravity term feed-forward unit 1520, and a friction term feed-forward unit 1530. Post-filter target position signals (other axes) output from the other-axis target position signal output unit 600 are input to the inertia term feed-forward unit 1510, the gravity term feed-forward unit 1520, and the friction term feed-forward unit 1530. These three types of feed-forward units enable the attitude of the articulated robot 1 to be found based on the post-filter target position signals (other axes), so the state of the own axis can be known, and thus inertia of the own axis and so forth can be known. This will be described in detail regarding each block.

The other-axis target position signal output unit 600 outputs post-filter target position signals (angle, angular speed, angular velocity) which are the output from the filter computation unit 400 generated in the same way at other axes. For example, in a case where the articulated robot 1 is a six-axis robot, the other-axis target position signal output unit 600 outputs to the motor control unit 1500 the post-filter target position signals for the five axes other than the object axis.

The inertia term feed-forward unit 1510 predicts the inertia that acts on the own axis, that is determined by the attitude of the articulated robot 1, and outputs to the current control unit 540 as a torque instruction value for feed-forward control.

The gravity term feed-forward unit 1520 predicts the gravitational effect acting on the own axis, which is determined by the attitude of the articulated robot 1, and outputs to the current control unit 540 as a torque instruction value for feed-forward control.

The friction term feed-forward unit 1530 predicts friction force acting on the own axis, and outputs to the current control unit 540 as a torque instruction value for feed-forward control.

A feature of the weaving control device 20 according to the second embodiment is that three types of feed-forward control units have been provided to the motor control unit 500 in the weaving control device 10. Accordingly, the dynamic characteristics from the target position signal to the current position signal detected by the encoder 560 can be similar to the filter used by the filter computation unit 400 more strictly.

According to this configuration, a good weaving waveform can be obtained just by performing correction of the weaving signal based on the filter, described in the first embodiment.

The three types of feed-forward control carried out here are designed based on a model (equation of motion) of the articulated robot 1. Calculation methods for each type of feed-forward control (inertia term, gravity term, friction term) will be described here with regard to a two-link robot illustrated in FIG. 11.

Figure 11:
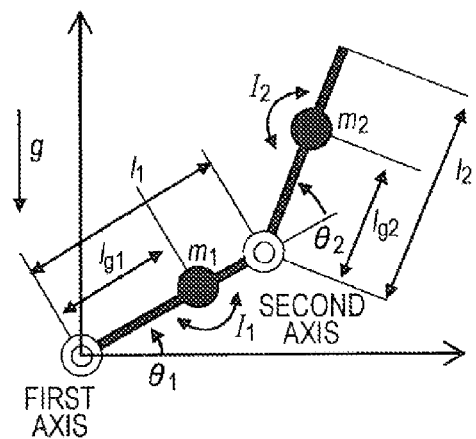
FIG. 11 is a schematic diagram of a 2-link robot.

When the equation of motion for the two-link robot illustrated in FIG. 11 is calculated, the torques $\tau 1$ and $\tau 2$ which act on each joint are represented by the following Expression (4) and Expression (5). Calculation is then performed as shown in the following Expression (6) through Expression (13), and the output of the three types of feed-forward control (inertia term, gravity term, friction term) relating to the first axis are calculated as shown in Expression (14).

[Math 4]

$$\tau_i = J_1 \ddot{\theta}_1 + J_{12} \ddot{\theta}_2 + C_1 + G_1 + F_1 \quad (4)$$

[Math 5]

$$\tau_2 = J_2 \ddot{\theta}_2 + J_{12} \ddot{\theta}_1 + C_2 + G_2 + F_2 \quad (5)$$

[Math 6]

Inertia term for first axis: (6)
$$J_1 = m_1 l_{g1}^2 + I_1 + m_2(l_1^2 + l_{g2}^2 + 2l_1 l_{g2}\cos(\theta_2)) + I_2$$

[Math 7]

Inertia term for second axis: (7)
$$J_2 = m_2 l_{g2}^2 + I_2$$

[Math 8]

Interference inertia term: (8)
$$J_{12} = m_2(l_{g2}^2 + l_1 l_{g2}\cos(\theta_2)) + I_2$$

[Math 9]

Centrifugal/Coriolis term for first axis: (9)
$$C_1 = -m_2 l_1 l_{g2}\sin(\theta_2)(2\dot{\theta}_1 \dot{\theta}_2 + \dot{\theta}_2^2)$$

[Math 10]

Centrifugal/Coriolis term for second axis: (10)
$$C_2 = -m_2 l_1 l_{g2}\sin(\theta_2)\dot{\theta}_1^2$$

[Math 11]

Gravity term for first axis: (11)
$$G_1 = m_1 g l_{g1} \cos(\theta_1) + m_2 g(l_1 \cos(\theta_1) + l_{g2}\cos(\theta_1 + \theta_2))$$

[Math 12]

Gravity term for second axis: (12)
$$G_2 = m_2 g l_{g2} \cos(\theta_1 + \theta_2)$$

[Math 13]

Friction term for first axis: $F_1 = a_1 \cdot \text{sign}(\dot{\theta}_1) + b_1 \dot{\theta}_1$ (13)
Friction term for second axis: $F_2 = a_2 \cdot \text{sign}(\dot{\theta}_2) + b_2 \dot{\theta}_2$

* Friction term assumed to be coulomb friction and viscous friction $a_1$,
  $a_1$: coulomb friction coefficients, $b_1$,
  $b_1$: viscous friction coefficients $$\text{sign}(x) = \begin{cases} 1 & (x > 0) \\ 0 & (x = 0) \\ -1 & (x < 0) \end{cases}$$

[Math 14]

Output of each type of feed-forward control relating to first axis (14)
Inertia term feed-forward unit: $J_1 \ddot{\theta}_1$
Gravity term feed-forward unit: $G_1$
Friction term feed-forward unit: $F_1$ Performing the above-described three types of feed-forward control enables the dynamic characteristics from the target position signal to the current position signal detected by the encoder 560 to match the filter used by the filter computation unit 400. Note that in the second embodiment, influence from the movement of other axes is not taken into consideration, so this is limited to single-axis movement. A case where influence from the movement of other axes is taken into consideration will be studied in a later-described third embodiment.

Also, even just partially performing the above-described three types of feed-forward control enables the dynamic characteristics from the target position signal to the current position signal detected by the encoder 560 to match the filter characteristics used by the filter computation unit 400 closer than in the first embodiment.

Figure 12:
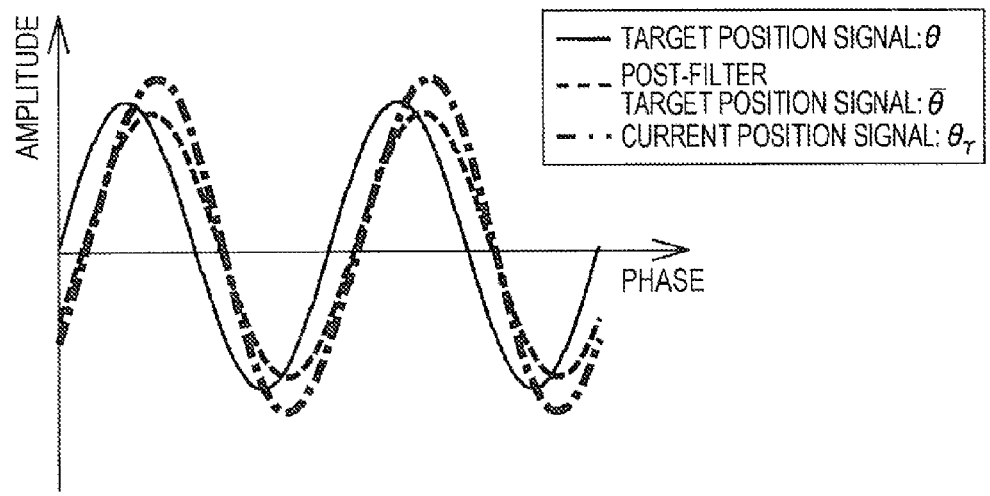
FIG. 12 is a diagram illustrating output waveforms of an articulated robot controlled by the control block diagram illustrated in FIG. 10 (speed FF only).
Figure 13:
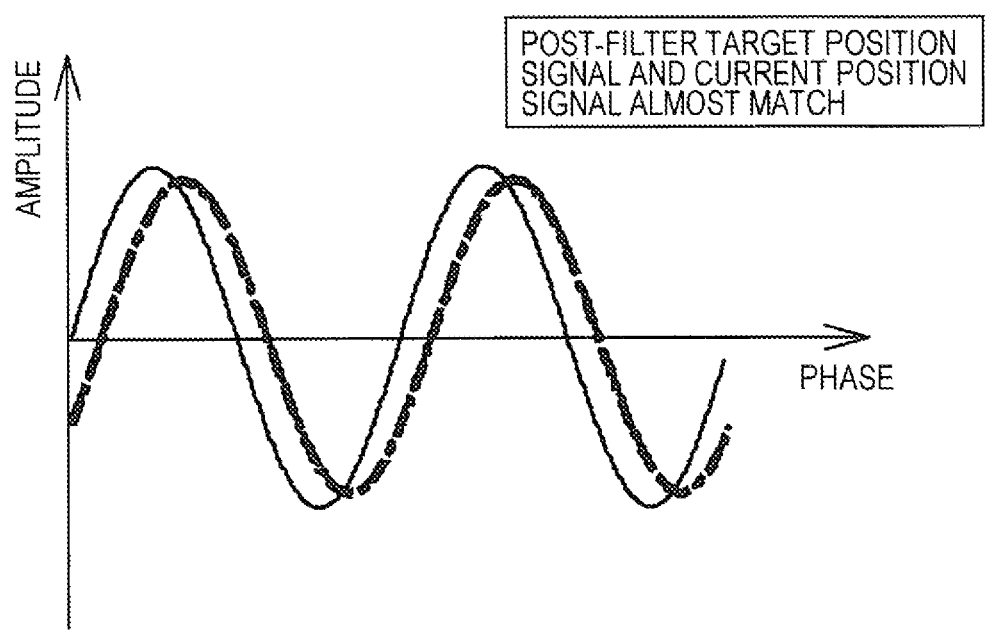
FIG. 13 is a diagram illustrating output waveforms of an articulated robot controlled by the control block diagram illustrated in FIG. 10 (speed FF+three-type FF).

FIG. 12 and FIG. 13 represent output waveforms in a case where a certain sine wave signal is input to the second axis of the above-described two-link robot as a target position signal. The target position signal at the first axis is zero. The solid line shows the target position signal, the broken line shows the post-filter target position signal, and the dot-dash line represents the current position signal of the motor 550.

FIG. 12 corresponds to the first embodiment, and shows output waveforms in a case of using only speed feed-forward control. FIG. 13 corresponds to the second embodiment, and shows output waveforms in a case of using speed feed-forward control, inertia term feed-forward control, gravity term feed-forward control, and friction term feed-forward control.

As can be seen from these, performing the three types of feed-forward control in addition to speed feed-forward control is more similar to the current position signals to the post-filter target position signals as compared to the case of speed feed-forward control alone. Thus, the precision when approximating the dynamic characteristics from the target position signal to current position signal to the filter characteristics can be improved.

Accordingly, a good weaving waveform can be obtained just by performing correction of weaving signals based on the filter, as described in the first embodiment.

Figure 14:
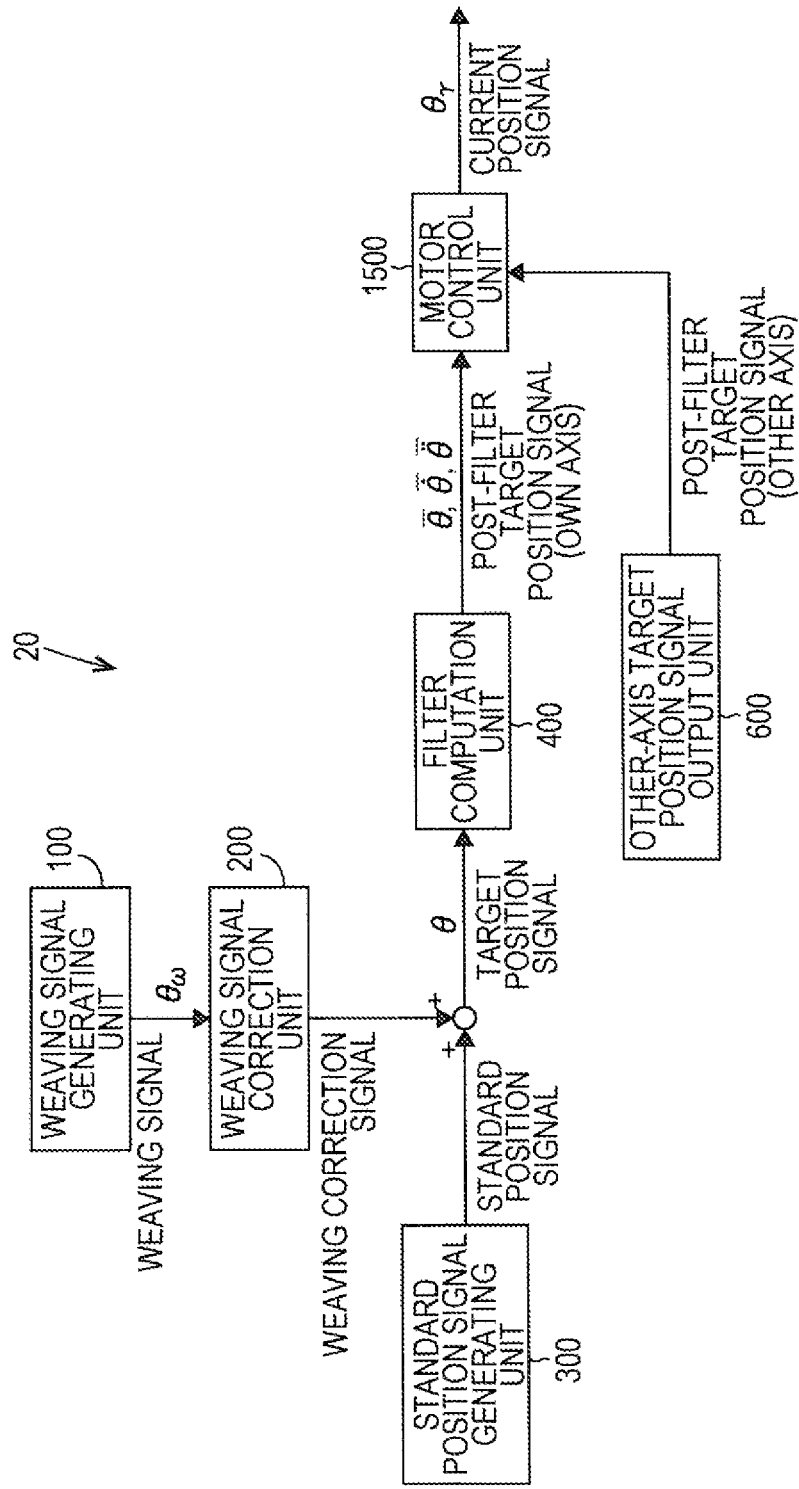
FIG. 14 is a simplified version of the control block diagram illustrated in FIG. 10.
Figure 15:
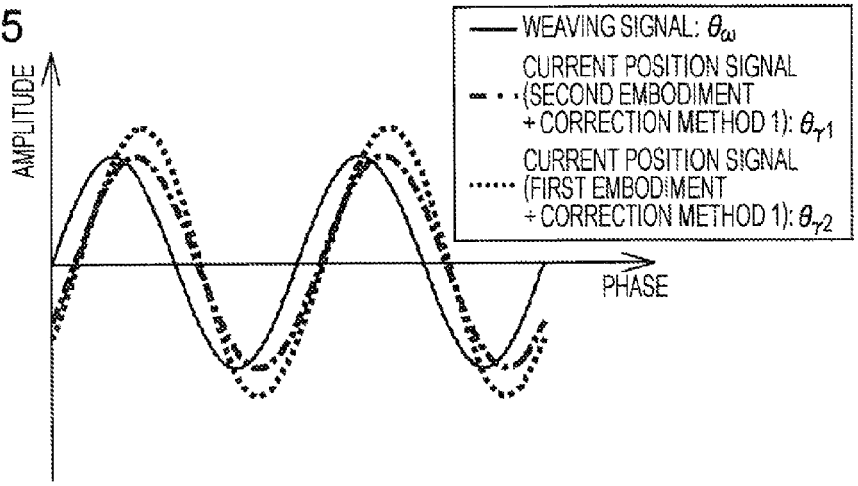
FIG. 15 is a diagram illustrating output waveforms of an articulated robot controlled by the control block diagram illustrated in FIG. 14.

FIG. 15 shows output waveforms in a case of using a control block (FIG. 14) using the gain correction method (correction method 1) described in the first embodiment. FIG. 15 shows the output waveform in a case of applying the correction method 1 to the second embodiment, and also shows the output waveform in a case of applying the correction method 1 to the first embodiment, for comparison.

FIG. 15 shows the output waveform of the second axis in a case of having performed the correction method 1 (gain correction), in a case of having input a certain sine wave signal as a weaving signal. The solid line represents the weaving signal, the dot-dash line represents the current position signal of the motor 550 when performing the correction method 1 in the second embodiment (second embodiment), and the dotted line represents the current position signal of the motor 550 when performing the correction method 1 in the first embodiment (first embodiment). Only a single axis is being driven here, so influence of other axes moving is not present. It can be seen from here that the amplitude of the current position signal of the motor 550 is closer to the amplitude of the weaving signal, and correction is being made suitably.

As described above, in the weaving control device according to the second embodiment, the inertia, gravity, and friction acting on each axis are predicted beforehand and input to the motor as suitable torque instruction values, in addition to the control of at the weaving control device according to the first embodiment. Accordingly, the precision of the dynamic characteristics from the target position to the motor output angle approximating the filter can be improved. Performing correction of the amplitude of the target position based on this filter suppressed occurrence of error in weaving movement occurring to dynamic characteristics of the motor itself which moves the axes of the articulated robot, and error in weaving movement occurring to influence at the own axis due to other axes moving. Accordingly, weaving and like movement can be performed with high trajectory precision.

Third Embodiment

A weaving control device 30 according to a third embodiment of the present invention will be described below. The weaving control device according to the present embodiment differs from the weaving control device 10 according to the first embodiment described above with regard to the way of the motor control unit giving control characteristics. Other configurations are the same as in the first embodiment, so description will not be repeated here regarding portions which overlap those described above.

In the second embodiment described above, three types of feed-forward control units were provided to the speed feed-forward unit 520 implemented in the first embodiment, whereby the dynamic characteristics from the target position signal to the current position signal can further be similar to the optionally designed filter. However, the second embodiment does not take into consideration the influence of other axes moving. However, there are case where the influence of other axes moving must be taken into consideration when approximating.

The weaving control device 30 according to the third embodiment adds control so that the dynamic characteristics from the target position signal to the current position signal can be similar to the optionally designed filter even more strictly. This enables the weaving precision to be further improved just by performing correction of the weaving signal based on the optionally designed filter.

Figure 16:
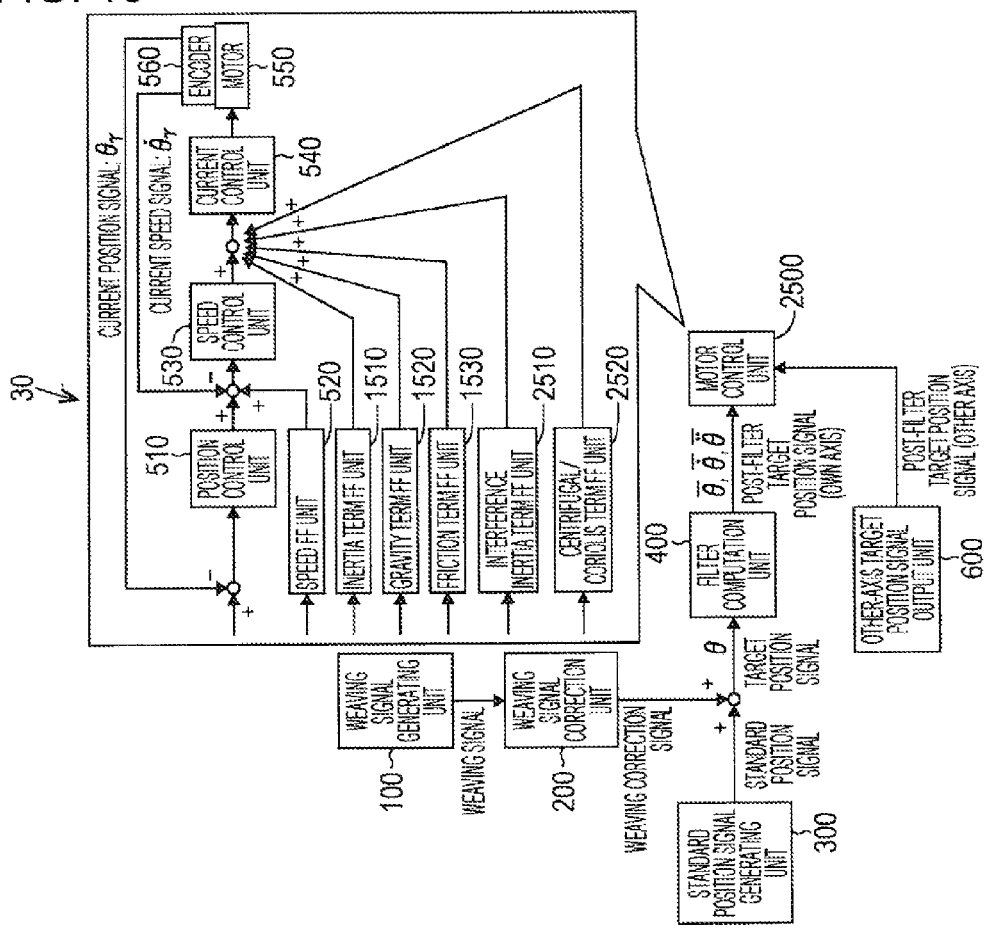
FIG. 16 is a control block diagram of a weaving control device according to a third embodiment of the present invention.

FIG. 16 so a control block diagram of the weaving control device 30 according to the third embodiment, in the same way as with FIG. 2 and FIG. 10, the control block diagram in FIG. 16 also corresponds to one joint axis of the multiple joint axes of the articulated robot 1.

The weaving control device 30 differs from the weaving control device 20 illustrated in FIG. 10 with regard to the point of being provided with a motor control unit 2500 instead of the motor control unit 1500.

The motor control unit 2500 is provided with a interference inertia term feed-forward unit 2510 and a centrifugal/Coriolis term feed-forward unit 2520, in addition to the configuration of the motor control unit 1500 of the weaving control device 20. Post-filter target position signals (other axes) output from the other-axis target position signal output unit 600 are input to the interference inertia term feed-forward unit 2510 and the centrifugal/Coriolis term feed-forward unit 2520. The point that post-filter target position signals (other axes) output from the other-axis target position signal output unit 600 are input to the inertia term feed-forward unit 1510, gravity term feed-forward unit 1520, and friction term feed-forward unit 1530, is the same as in the weaving control device 20. Each block will be described in detail below.

The interference inertia term feed-forward unit 2510 predicts inertia acting on the arm of the own axis due to other axes moving, and outputs as a torque instruction value for feed-forward control of the current control unit 540.

The centrifugal/Coriolis term feed-forward unit 2520 predicts centrifugal/Coriolis force acting on the arm of the own axis due to other axes moving, and outputs as a torque instruction value for feed-forward control of the current control unit 540.

A feature of the weaving control device 30 according to the third embodiment is that two types of feed-forward control units have further been provided to the motor control unit 1500 in the weaving control device 20 according to the second embodiment, to compensate for the influence of other axes moving. Accordingly, the dynamic characteristics from the target position signal to the current position signal detected by an encoder 560 are similar to the filter used by the filter computation unit 400 more strictly.

According to this configuration, a good weaving waveform can be obtained just by performing correction of the weaving signal based on the filter, described in the first and second embodiments.

The two types of feed-forward control carried out here are designed based on a model (equation of motion) of the articulated robot 1. Calculation methods for each type of feed-forward control (interference inertia term, centrifugal/Coriolis term) will be described here with regard to the two-link robot illustrated in FIG. 11.

When the equation of motion for the two-link robot illustrated in FIG. 11 is calculated, the torques τ1 and τ2 which act on each joint are represented by the following Expression (15) and Expression (16). Calculation is then performed as shown in the following Expression (17) through Expression (19), and the output of the two types of feed-forward control (interference inertia term, centrifugal/Coriolis term) relating to the first axis are calculated as shown in Expression (20). Note that portions of the following equations not related to the interference inertia term and centrifugal/Coriolis term are not written.

[Math 15]

$$\phi_1 = J_1\ddot{\theta}_1 + J_{12}\ddot{\theta}_2 + C_1 + G_1 + F_1 \tag{15}$$

[Math 16]

$$\phi_2 = J_2\ddot{\theta}_2 + J_{12}\ddot{\theta}_1 + C_2 + G_2 + F_2 \tag{16}$$

[Math 17]

Interference Inertia Term:

$$J_{12} = m_2(l_{g2}^2 + l_1 l_{g2}\cos(\theta_2)) + I_2 \tag{17}$$

[Math 18]

Centrifugal/Coriolis Term for First Axis:

$$C_1 = -m_2 l_1 l_{g2}\sin(\theta_2)(2\dot{\theta}_1\dot{\theta}_2 + \dot{\theta}_2^2) \tag{18}$$

[Math 19]

Centrifugal/Coriolis Term for Second Axis:

$$C_2 = -m_2 l_1 l_{g2} \sin(\theta_2) \dot{\theta}_1^2 \quad (19)$$

Output of Each Type of Feed-Forward Control Relating to First Axis

[Math 20]

Interference Inertia Term Feed-Forward Unit:

$$J_{12} \ddot{\theta}_{2_1}$$

Centrifugal/Coriolis Term Feed-Forward Unit:

$$C_1 \quad (20)$$

Performing the above-described two types of feed-forward control in addition to the above-described three types of feed-forward control according to the second embodiment enables the dynamic characteristics from the target position signal to the current position signal detected by the encoder 560 to match the filter characteristics used by the filter computation unit 400, even in a case where another axis moves.

Also, even just partially performing the above-described two types of feed-forward control enables the dynamic characteristics from the target position signal to the current position signal detected by the encoder 560 to match the filter used by the filter computation unit 400 closer than in the first and second embodiments.

Figure 17:
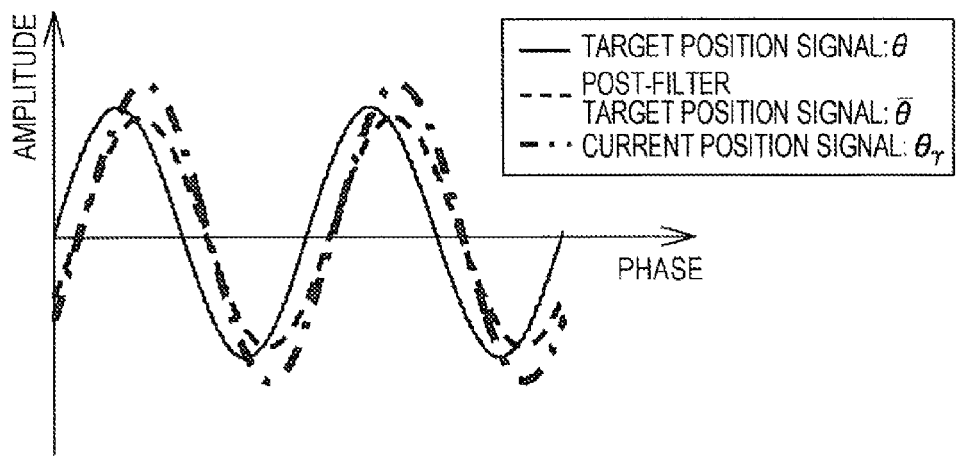
FIG. 17 is a diagram illustrating output waveforms of an articulated robot controlled by the control block diagram illustrated in FIG. 16 (speed FF+three-type FF).
Figure 18:
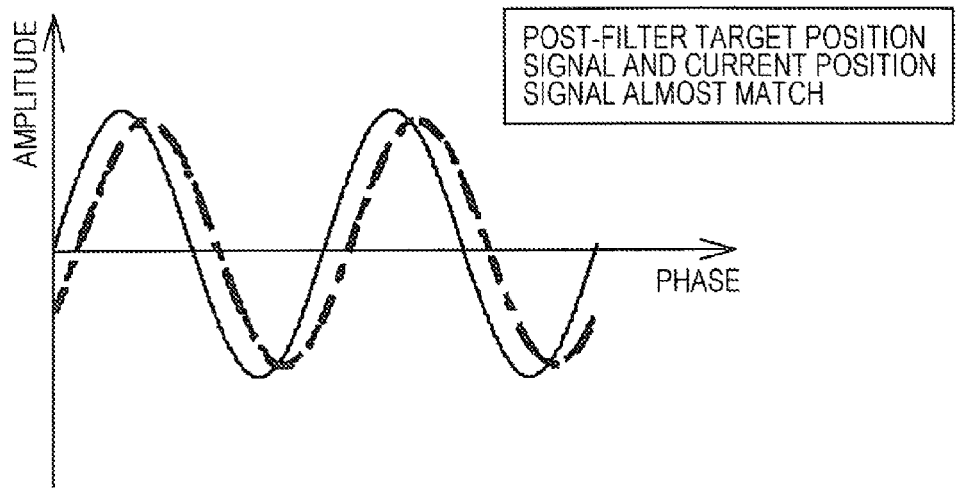
FIG. 18 is a diagram illustrating output waveforms of an articulated robot controlled by the control block diagram illustrated in FIG. 16 (speed FF+five-type FF).

FIG. 17 and FIG. 18 represent the output waveform of the second axis in a case where a certain sine wave signal is input to each joint of the above-described two-link robot as a target position signal. The solid line shows the target position signal, the broken line shows the post-filter target position signal, and the dot-dash line represents the current position signal of the motor 550.

FIG. 17 corresponds to the second embodiment, and shows output waveforms in a case of using speed feed-forward control, inertia term feed-forward control, gravity term feed-forward control, and friction term feed-forward control. FIG. 18 corresponds to the third embodiment, and shows output waveforms in a case of using interference inertia term feed-forward control and centrifugal/Coriolis term feed-forward control.

As can be seen from these, adding interference inertia term feed-forward control and centrifugal/Coriolis term feed-forward control is more similar to the current position signals to the post-filter target position signals, even if other axes move. Thus, the precision when approximating the dynamic characteristics from the target position signal to current position signal to the filter characteristics can be improved.

Accordingly, a good weaving waveform can be obtained just by performing correction of weaving signals based on the filter, as described in the first and second embodiments.

Figure 19:
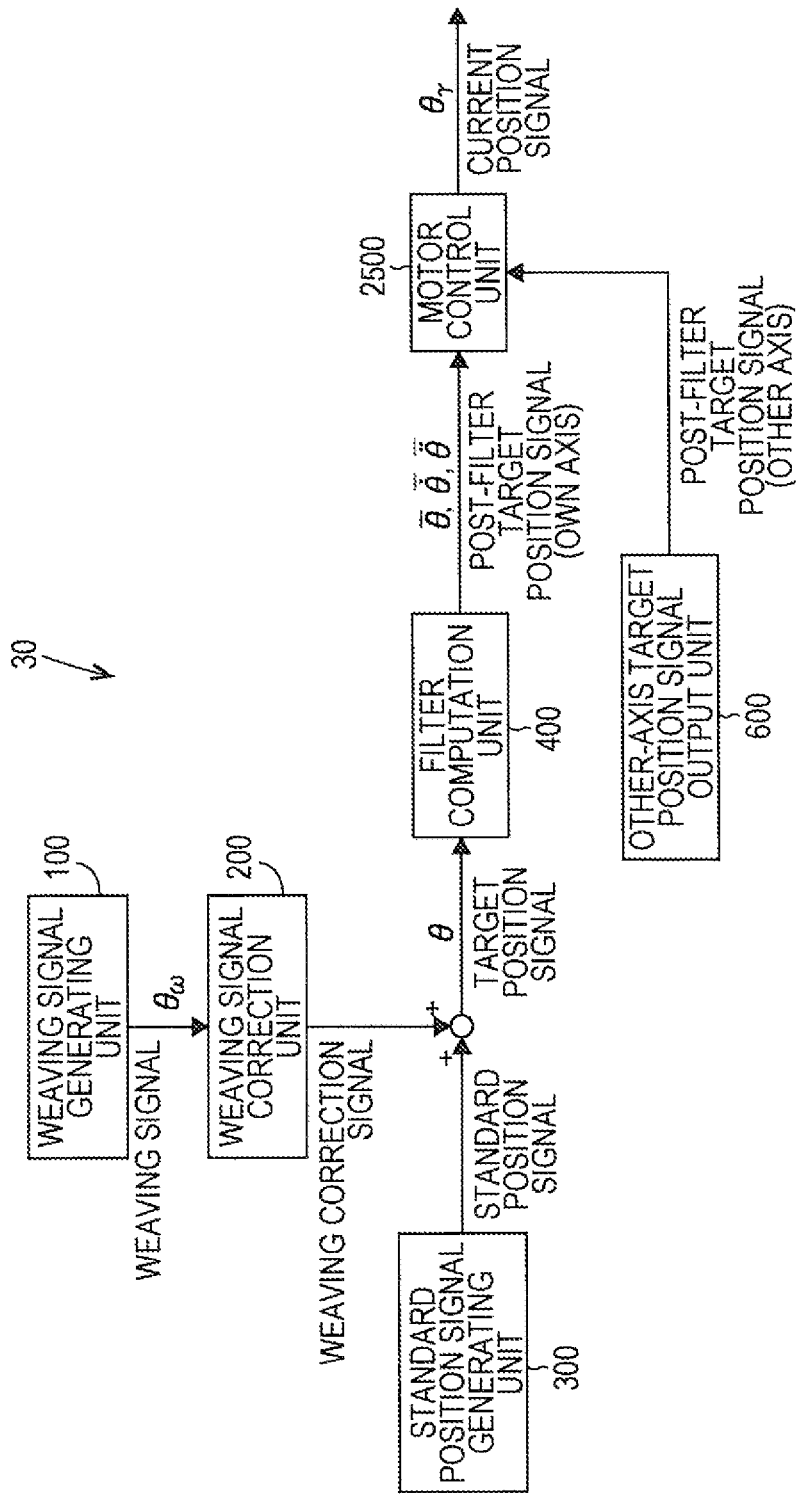
FIG. 19 is a simplified version of the control block diagram illustrated in FIG. 16.
Figure 20:
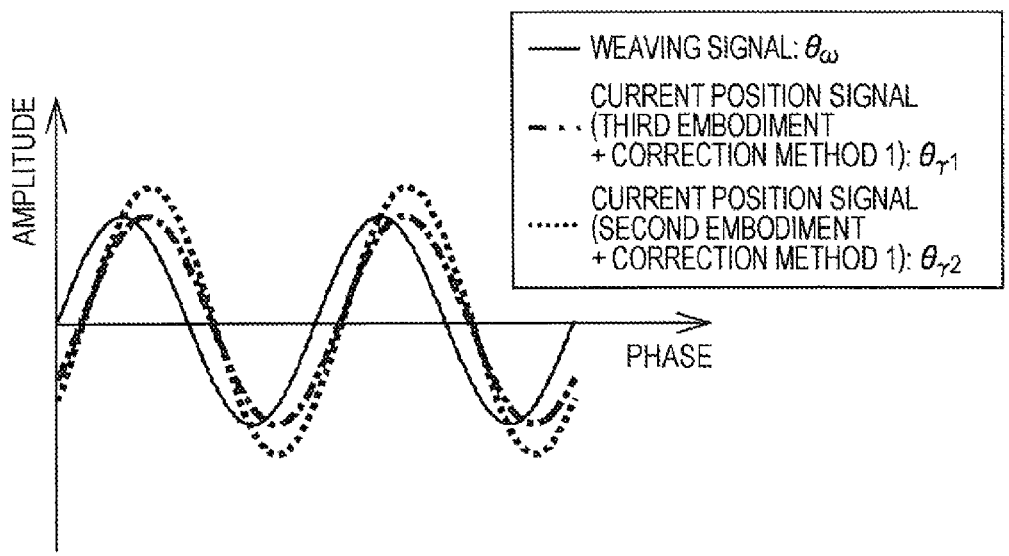
FIG. 20 is a diagram illustrating output waveforms of an articulated robot controlled by the control block diagram illustrated in FIG. 19.

FIG. 20 shows output waveforms in a case of using a control block (FIG. 19) using the gain correction method (correction method 1) described in the first embodiment. FIG. 20 shows the output waveform of the second axis in a case of applying the correction method 1 to the third embodiment, and also shows the output waveform of the second axis in a case of applying the correction method 1 to the second embodiment.

FIG. 20 shows the output waveform of the second axis in a case of having performed the correction method 1 (gain correction), in a case of having input a certain sine wave signal as a weaving signal to each joint. The solid line represents the weaving signal, the dot-dash line represents the current position signal of the motor 550 when performing the correction method 1 in the third embodiment (third embodiment), and the dotted line represents the current position signal of the motor 550 when performing the correction method 1 in the second embodiment (second embodiment). It can be seen from here that the amplitude of the current position signal of the motor 550 in the third embodiment is closer to the amplitude of the weaving signal as compared to the second embodiment, and correction is being made suitably.

As described above, in the weaving control device according to the third embodiment, the inertia and centrifugal/Coriolis force acting on an i-axis (own axis) due to an axis other than the i-axis accelerating or decelerating are predicted beforehand and input to the motor as suitable torque instruction values, in addition to the control of at the weaving control device according to the second embodiment. Accordingly, influence of other axes moving can be suppressed, and the precision of the dynamic characteristics from the target position to the motor output angle approximating the filter can be improved. Performing correction of the amplitude of the target position based on this filter suppressed occurrence of error in weaving movement occurring to dynamic characteristics of the motor itself which moves the axes of the articulated robot, and error in weaving movement occurring to influence at the own axis due to other axes moving. Accordingly, weaving and like movement can be performed with high trajectory precision.

<Modification>

A weaving control device according to a modification of the present invention will be described below. The present modification is applicable to the weaving control devices according to the first through third embodiments described above, and relates to a method of generating target position signals input to the filter computation unit 400. Other configurations of the present modification are the same as in the first through third embodiments, so description will not be repeated here regarding portions which overlap those described above.

Figure 21:
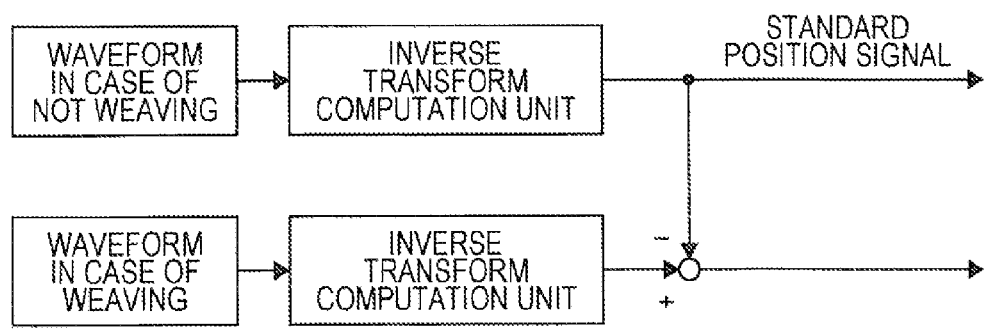
FIG. 21 is a diagram illustrating a standard position signal and weaving signal generating method according to a modification of an embodiment of the present invention.

The above-described modifications perform correction of weaving signals in each axis coordinate system of the articulated robot 1. Accordingly, there is a need to separate the standard position signals and weaving signals in each axis coordinate system for calculation, as illustrated in FIG. 21. However, this necessitates inverse transform for calculating angular instruction values for each axis in a case of weaving and a case of no weaving, so the calculation load is great.

Accordingly, the present modification enables simpler correction. The present modification will be described with reference to FIG. 22.

Figure 22:
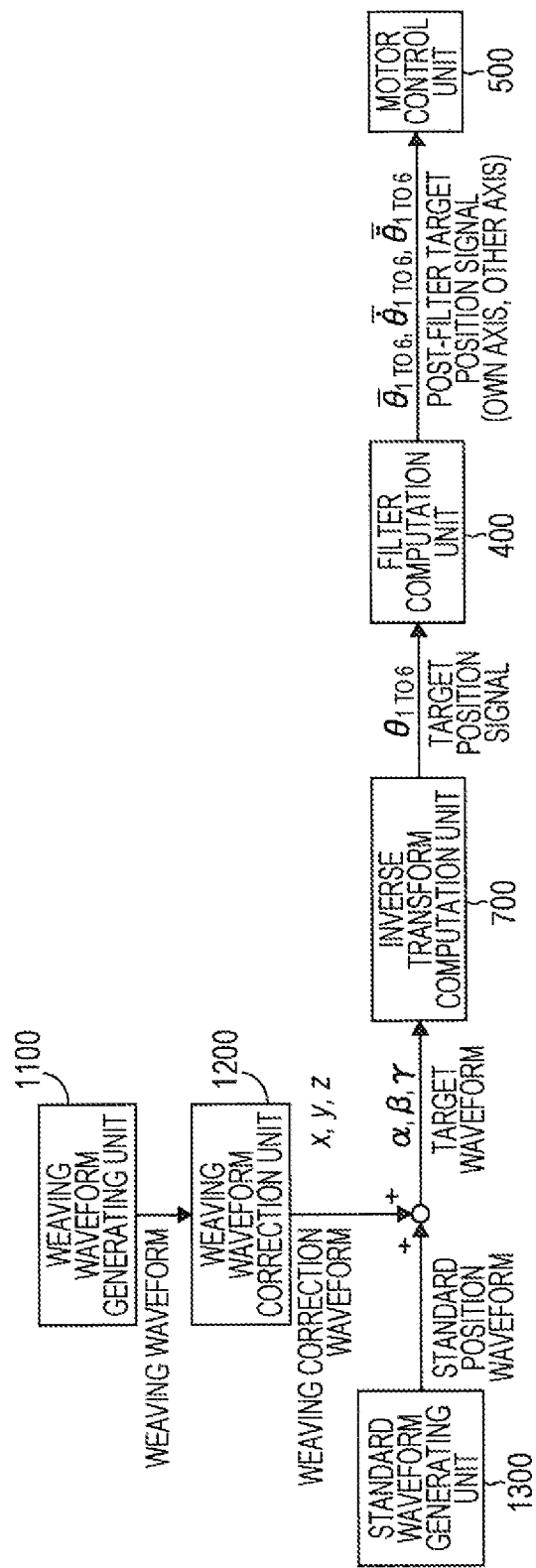
FIG. 22 is a control block diagram of a weaving control device according to a modification of an embodiment of the present invention.

AS illustrated in FIG. 22, the control device according to the present modification further includes an inverse transform computation unit 700 in the control block of the above-described embodiments (FIG. 2, FIG. 10, FIG. 16). The blocks will be described in detail below.

A weaving waveform generating unit 1100 generates a waveform to be added to the above-described standard position waveform as a weaving waveform, to perform weaving at an instructed amplitude and frequency. This weaving waveform is expressed by a three-dimensional position to express the tip position, and an angle to express the tip attitude.

A weaving waveform correction unit 1200 generates a weaving correction waveform by correcting the weaving waveform generated by the weaving waveform generating unit 1100. The correction method is the same as that described in the first embodiment.

A standard waveform generating unit 1300 generates a standard position waveform, as the tip trajectory of the articulated robot 1 in a case of not weaving. This standard position waveform is expressed by a three-dimensional position to express the tip position, and an angle to express the tip attitude.

The inverse transform computation unit 700 performs inverse transform on a target waveform obtained by adding the weaving correction waveform to the standard position waveform, thereby generating target position signals for each of the joints. This target waveform is expressed by a three-dimensional position to express the tip position, and an angle to express the tip attitude.

Thus, inverse transform only has to be performed once in the present embodiment, so the correction method according to the embodiments of the present invention can be applied without increasing the calculation load.

It should be noted that the embodiments disclosed herein are exemplary in all points and should be understood to be non-restricting. The scope of the present invention is set forth in the Claims and not the above description, and includes all modifications within meanings equivalent to the scope of the Claims and scope thereof. This application is based on the Japanese Patent Application filed Oct. 19, 2012 (Japanese Patent Application No. 2012-231871), the contents of which are hereby incorporated by reference.

REFERENCE SIGNS LIST

1 articulated robot
10, 20, 30 weaving control device
100 weaving signal generating unit
200 weaving signal correction unit
300 standard position signal generating unit
400 filter computation unit
500, 1500, 2500 motor control unit
510 position control unit
520 speed feed-forward unit
530 speed control unit
540 current control unit
550 motor
560 encoder
600 other-axis target position signal output unit
700 inverse transform computation unit
1100 weaving waveform generating unit
1200 weaving waveform correction unit
1300 standard waveform generating unit
1510 inertia term feed-forward unit
1520 gravity term feed-forward unit
1530 friction term feed-forward unit
2510 interference inertia term feed-forward unit
2520 centrifugal/Coriolis term feed-forward unit

The invention claimed is:

1. A weaving control device for an articulated robot which drives a plurality of joint axes so that a tool attached to the articulated robot traces a desired weaving trajectory, the control device comprising:
a signal computation unit that computes a target position signal for each axis of the articulated robot based on the weaving trajectory;
a filter computation unit that performs low-pass filter processing on the computed target position signal to remove a natural frequency component of the articulated robot, and computers a filter-processed target instruction signal for each axis of the articulated robot; and
a motor control unit that drives each axis of the articulated robot with the filter-processed target instruction signal as input;
wherein the frequency characteristics of gain at the motor control unit are configured approximately flat;
and wherein the signal computation unit computes a gain-corrected target position signal.

2. The control device according to claim 1,
wherein the motor control unit includes a position feedback unit and a speed feedback unit and a speed feed-forward unit;
and wherein the signal computation unit computes a gain-corrected target position signal based on filter characteristics at the filter computation unit and the weaving trajectory.

3. The control device according to claim 2,
wherein the motor control unit further includes a feed-forward control unit which predicts inertia force, gravity, and friction force acting on an own axis by the own axis accelerating/decelerating, and adds these to a torque instruction value output from the speed feedback unit.

4. The control device according to claim 3,
wherein the motor control unit further includes a feed-forward control unit which predicts inertia force and centrifugal/Coriolis force acting on the own axis by another axis accelerating/decelerating, and adds these to a torque instruction value output from the speed feedback unit.

5. The control device according to claim 1,
wherein the filter used for the low-pass filter processing is the same for all axes;
and wherein the signal computation unit computes a gain-corrected target position signal by multiplying the target position signal by an inverse of a filter gain in a weaving frequency obtained from filter characteristics of the filter computation unit.

6. The control device according to claim 1,
wherein the signal computation unit computes a target position signal subjected to phase compensation, in addition to gain correction, based on filter characteristics of the filter computation unit and weaving frequency obtained from filter characteristics of the filter computation unit.

* * * * *